US012584577B2

(12) United States Patent
Borel et al.

(10) Patent No.:     US 12,584,577 B2
(45) Date of Patent:         Mar. 24, 2026

(54) QUICK OBTURATION COUPLING CONNECTION

(71) Applicant: AKWEL, Champfromier (FR)

(72) Inventors: Stéphane Borel, Bedarrides (FR); Peter Faulstroh, Sutton Coldfield (GB)

(73) Assignee: AKWEL, Champfromier (FR)

( * ) Notice: Subject to any disclaimer, the term of this patent is extended or adjusted under 35 U.S.C. 154(b) by 0 days.

(21) Appl. No.: 18/711,700

(22) PCT Filed: Nov. 17, 2022

(86) PCT No.: PCT/FR2022/052116
§ 371 (c)(1),
(2) Date: May 20, 2024

(87) PCT Pub. No.: WO2023/089279
PCT Pub. Date: May 25, 2023

(65) Prior Publication Data
US 2025/0012392 A1     Jan. 9, 2025

(30) Foreign Application Priority Data
Nov. 22, 2021   (FR) ................................. FR2112325

(51) Int. Cl.
*F16L 37/32*        (2006.01)
*F16L 37/088*       (2006.01)

(52) U.S. Cl.
CPC ........... *F16L 37/32* (2013.01); *F16L 37/0885* (2019.08)

(58) Field of Classification Search
CPC .............................. F16L 37/0885; F16L 37/32
See application file for complete search history.

(56) References Cited

U.S. PATENT DOCUMENTS 2,548,528 A  *  4/1951  Hansen .................... F16L 37/23
                                                            137/614.04
2,898,130 A     8/1959  Hansen
                    (Continued)

FOREIGN PATENT DOCUMENTS

EP          2 042 798 B1      1/2011

OTHER PUBLICATIONS

Feb. 17, 2023 Search Report issued in International Patent Application No. PCT/FR2022/052116.
(Continued)

*Primary Examiner* — David Colon-Morales
(74) *Attorney, Agent, or Firm* — OLIFF PLC

(57)         ABSTRACT

A fluidic coupler includes male and female connectors, each including an inner fluid duct and a valve that is elastically displaceable in the duct wherein the valves interact with one another by mutually pushing one another into a fluidically open position in a coupling configuration and wherein the valves are elastically returned to a position in which the duct is sealed closed by closing heads in a configuration in which the two connectors are uncoupled, the body of one of the valves including a section for connecting the closing head to the free joining end with a portion that is convergent in the direction of a neck and a portion that is divergent up to the free joining end to define a widened end joining surface, and the closing head of the other valve is truncated at its free joining end to define a widened end joining surface.

16 Claims, 6 Drawing Sheets

(56)                References Cited

U.S. PATENT DOCUMENTS

| 3,196,897 | A | * | 7/1965 | Hodson | F16L 37/23 |
| | | | | | 137/614.04 |
| 3,336,944 | A | | 8/1967 | Anderson et al. | |
| 3,788,348 | A | * | 1/1974 | Johnson | F16L 37/23 |
| | | | | | 137/614.04 |
| 4,274,441 | A | * | 6/1981 | Fischer | F16L 37/32 |
| | | | | | 251/149.6 |
| 4,483,368 | A | * | 11/1984 | Panthofer | F16L 37/32 |
| | | | | | 251/149.6 |
| 4,763,683 | A | * | 8/1988 | Carmack | F16L 37/32 |
| | | | | | 141/285 |
| 4,905,733 | A | * | 3/1990 | Carow | B67D 7/3218 |
| | | | | | 137/614.04 |
| 6,161,579 | A | * | 12/2000 | Vulliet | F16L 37/32 |
| | | | | | 137/614.04 |
| 6,206,040 | B1 | * | 3/2001 | Smith, III | F16L 29/00 |
| | | | | | 137/614.04 |
| 6,626,207 | B1 | * | 9/2003 | Smith, III | F16L 37/32 |
| | | | | | 137/614.04 |
| 6,871,837 | B2 | * | 3/2005 | Mikiya | F16L 37/32 |
| | | | | | 137/614.04 |
| 7,117,892 | B2 | * | 10/2006 | Krywitsky | F16L 37/252 |
| | | | | | 137/614.04 |
| 7,921,875 | B2 | * | 4/2011 | Moriiki | F16L 37/32 |
| | | | | | 137/614.04 |
| 8,109,290 | B2 | * | 2/2012 | Sato | F16L 37/34 |
| | | | | | 251/149.6 |
| 8,602,057 | B2 | * | 12/2013 | Abura | F16L 37/23 |
| | | | | | 251/149.6 |
| 8,931,499 | B2 | * | 1/2015 | Clever | F16L 27/04 |
| | | | | | 137/614.04 |
| 9,188,267 | B2 | * | 11/2015 | Fansler | F16L 37/144 |
| 9,611,964 | B2 | * | 4/2017 | Nezu | F16L 37/0885 |
| 9,909,703 | B2 | * | 3/2018 | Van Scyoc | F16L 37/32 |
| 9,958,098 | B2 | * | 5/2018 | Nezu | F16B 7/0406 |
| 10,864,364 | B2 | * | 12/2020 | Mack | A61M 39/26 |
| 11,168,819 | B2 | * | 11/2021 | Gaudiau | F16L 37/0885 |
| 11,320,076 | B2 | * | 5/2022 | Rohde | F16L 37/0885 |
| 11,821,558 | B2 | * | 11/2023 | Janik | F16L 37/40 |
| 12,007,055 | B2 | * | 6/2024 | Abraham Carabano | |
| | | | | | F16L 37/086 |
| 12,104,734 | B2 | * | 10/2024 | Schröter | F16L 37/35 |
| 12,123,530 | B2 | * | 10/2024 | Choo | H01M 10/6567 |
| 2006/0278839 | A1 | | 12/2006 | Krywitsky | |
| 2009/0091129 | A1 | | 4/2009 | Moriiki et al. | |
| 2017/0191595 | A1 | | 7/2017 | Van Scyoc | |
| 2018/0304066 | A1 | | 10/2018 | Ciccone et al. | |

OTHER PUBLICATIONS

Feb. 17, 2023 Written Opinion issued in International Patent Application No. PCT/FR2022/052116.

* cited by examiner

[Fig. 1]
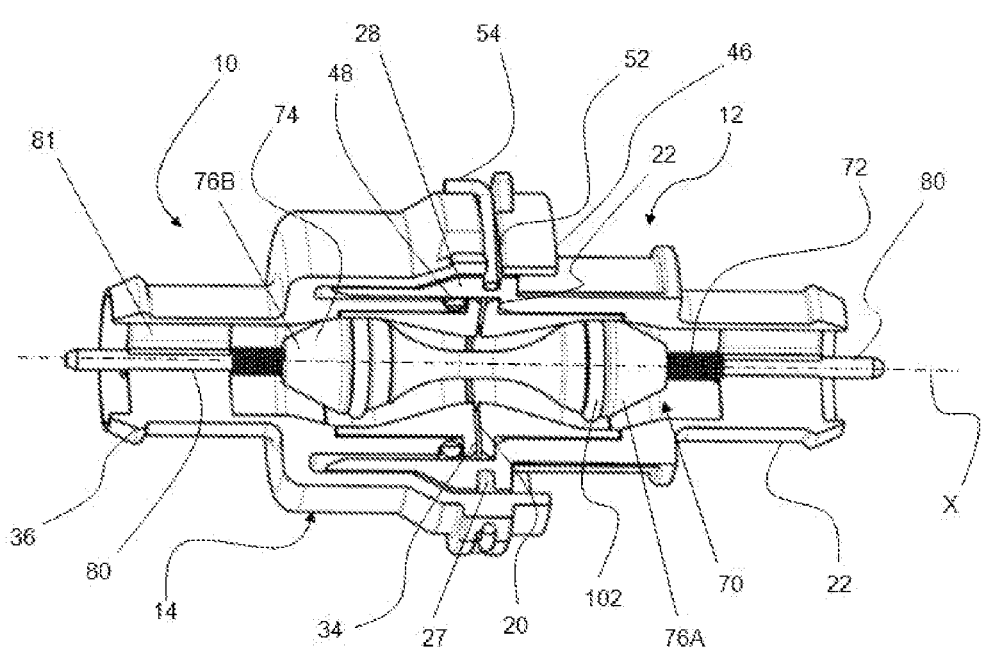

[Fig. 2]
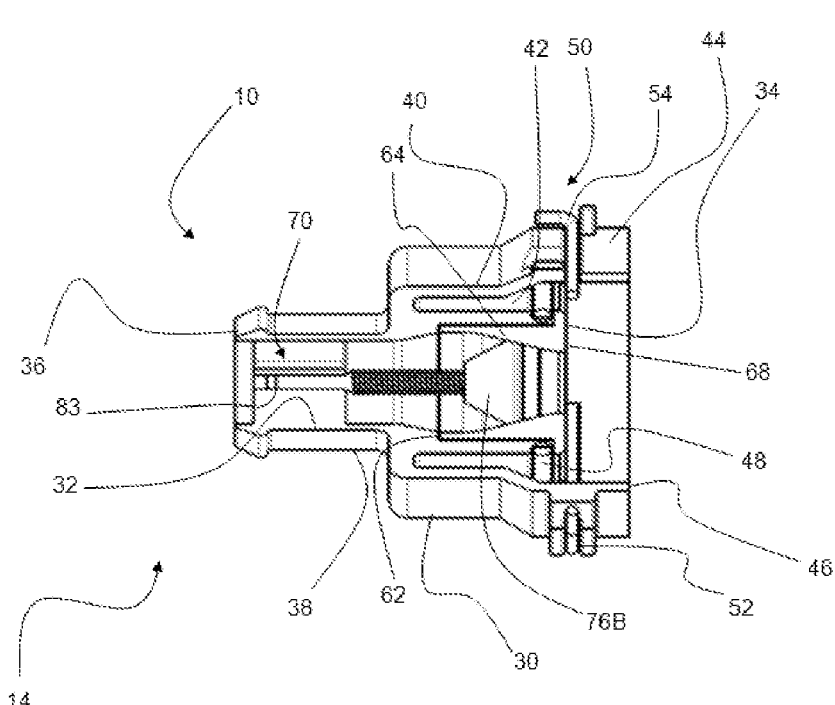

[Fig. 3]
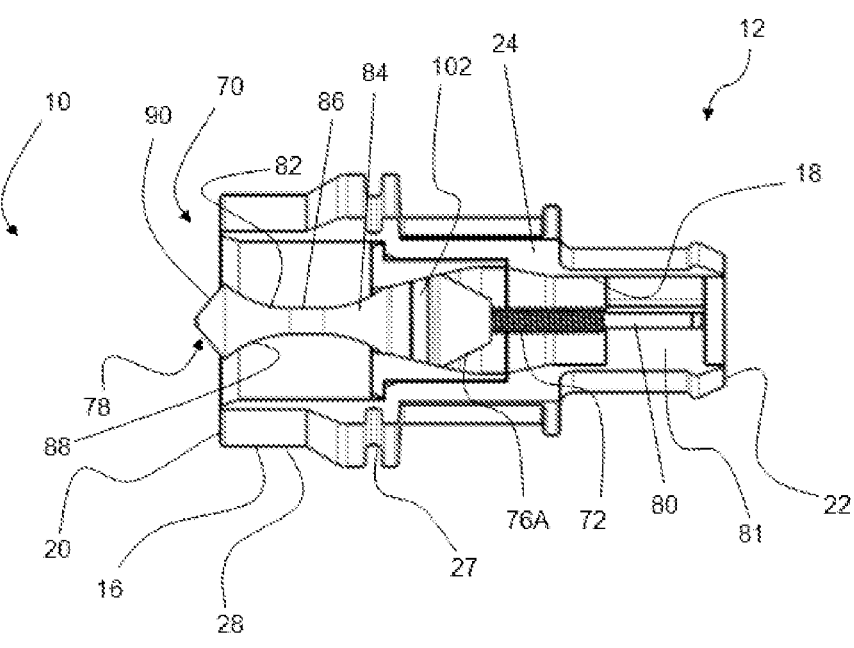

[Fig. 4]
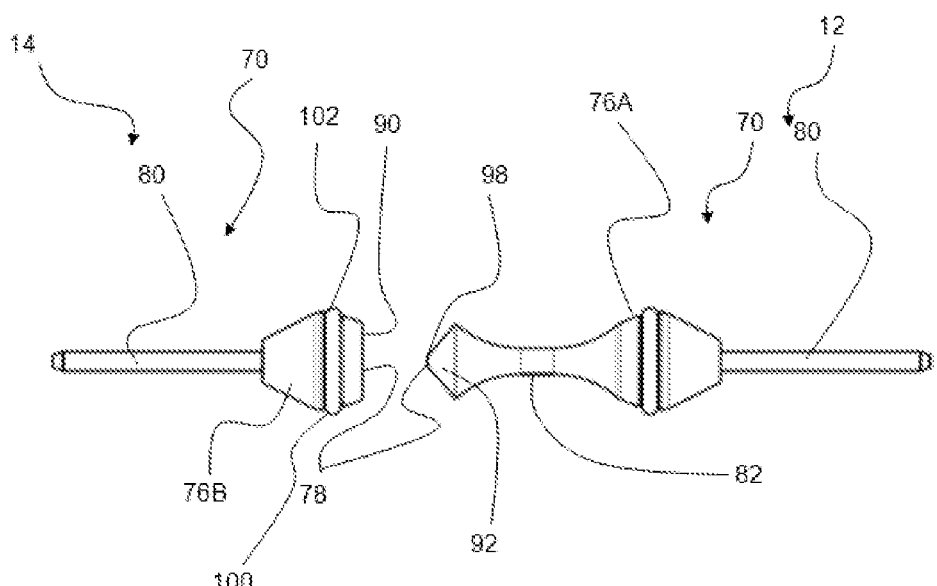

[Fig. 5]

[Fig. 6]
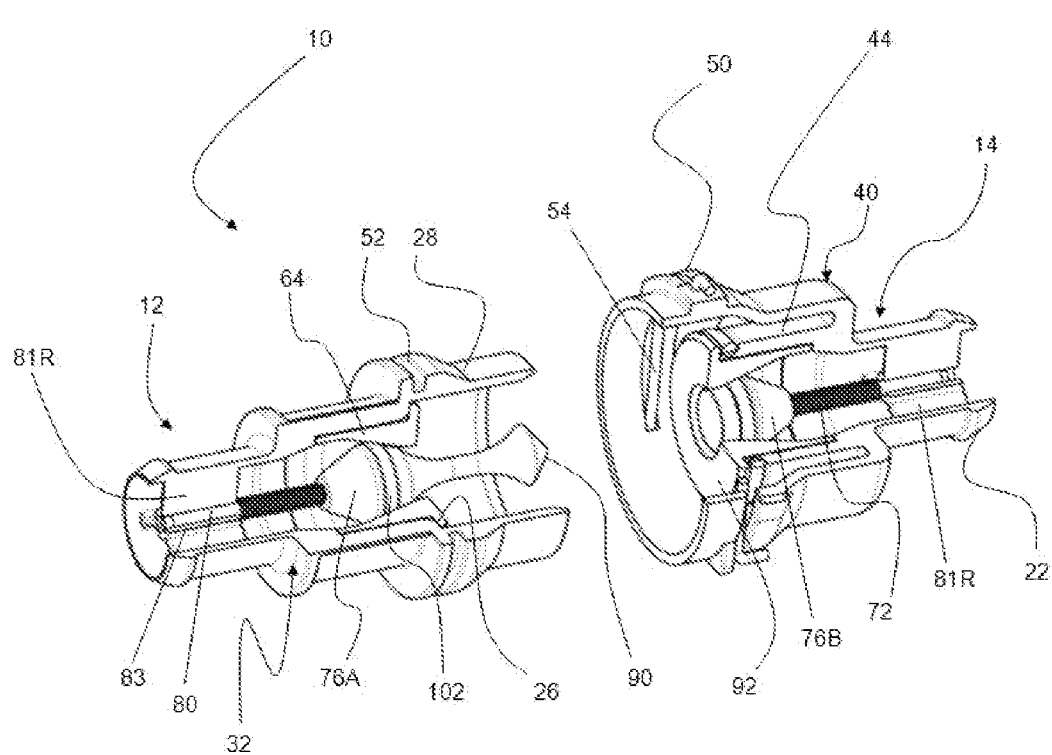

QUICK OBTURATION COUPLING CONNECTION

TECHNICAL FIELD

The present invention relates to the technical field of fluid transport such as air or water, in particular in a fluid transfer circuit. It applies more particularly but not exclusively to the transfer of fluid in a fuel circuit, an air or vacuum circuit, a steam circuit or a cooling circuit of an engine, a battery for an electric or hybrid vehicle, power electronics or others, for example by means of a heat exchanger. The invention relates more particularly to a quick obturation fluidic connection for fluid transfer from such a fluid transfer circuit.

In general, such a fluidic connection comprises a female connector and a male connector having complementary inner and outer shapes allowing them to cooperate by fitting. Thus, the female connector comprises a receiving orifice configured to receive by complementary shape an end tip of the male connector so that the male and female connectors can be easily joined to one another by a simple axial engagement movement of the male connector into the female connector. Moreover, a locking of the tip of the male connector and the female connector can be achieved by quick fixing elements, such as clips, snap tabs and/or fixing staples.

In order to ensure fluid tightness of this connection during the separation of the two connectors, such a connection further comprises valves elastically returned by springs and placed respectively in the female and male portions which are interacting when the connection is coupled so that the pipe is then open and, when the connection is uncoupled, the valves interact with annular sealing seats formed respectively in the female and male portions.

PRIOR ART

Such a connection is already known from the prior art of patent EP2042798 B1. In the document, the two valves are in the shape of an elongated body with a widened obturation head and a joining nose of generally frustoconical shape that is convergent in the direction of the proximal free end of the two connectors.

In this patent, the relative positioning of the two joining noses can be imprecise and can cause axial alignment defects of the two valves. This can cause premature wear of the valve bodies, requiring complete replacement of the worn connection. The axial alignment defect of the two valves can also in certain cases make the coupling of the two connectors impossible.

SUMMARY OF THE INVENTION

For this purpose, the object of the invention is a quick obturation fluidic connection comprising a male connector and a female connector capable of fitting into one another, each connector comprising an inner fluid passageway along a main axis and a valve that is axially displaceable in the passageway against an elastic return member, the valve comprising a body provided with a portion of widened section forming an obturation head and a proximal free end for junction with the other valve, wherein the valves interact with one another by mutually pushing one another into a fluidically open position in a coupling configuration of the two connectors and wherein the valves are elastically returned to a sealed obturation position of the passageway by means of their obturation heads in a configuration in which the two connectors are uncoupled, characterised in that the body of one of the valves comprises a segment for connecting the obturation head to the free joining end with a portion that is convergent in the direction of a neck and a portion that is divergent up to the free joining end to define a widened end joining surface and the obturation head of the other valve is truncated at its free joining end to define a widened end joining surface, the two widened joining surfaces interacting with one another in the coupling configuration of the two connectors via complementary embedding reliefs formed on said surfaces.

Thanks to the connection of the invention, the relative positioning of the two valves in the coupling configuration is facilitated by the presence of the two widened end joining surfaces and their embedding reliefs. The positioning offset outside the axis of the two valves is made almost impossible, which allows on the one hand to limit the phenomena of premature wear of the valves related to a positioning offset and on the other hand to guarantee the systematic achievement of the coupling of the connectors.

This conformation of the valve joining surfaces allows self-centring of the valves when coupling the two connectors.

A connection according to the invention may comprise one or more of the following features.

In a preferred embodiment of the invention, each obturation head comprises a circumferential groove for housing a sealing gasket.

In a preferred embodiment of the invention, in the coupling configuration, the two joined valves form a substantially symmetrical member of revolution around the main axis, with a longitudinal section which varies according to substantially a curvilinear and progressive longitudinal profile.

In a preferred embodiment of the invention, in the coupling configuration, the inner passageways of the two connectors join substantially continuously from each other and the section of the resulting passageway varies progressively and continuously along the main axis.

In a preferred embodiment of the invention, the profile of said segment has a substantially hyperboloid general shape.

In a preferred embodiment of the invention, the joining surface of one of the valves is provided with a cavity and the joining surface of the other of the valves is in the shape of a domed vertex shaped to match the shape of the cavity.

In a preferred embodiment of the invention, the joining surface in the shape of a domed vertex has a generally conical shape provided with a centring point end.

In a preferred embodiment of the invention, one of the obturation heads has a general entire ovoid shape having a vertex axially defining distal and proximal portions each having a progressively decreasing section from the vertex and the other of the obturation heads has a general partial ovoid shape, which is truncated after the vertex in its proximal portion.

In a preferred embodiment of the invention, the inner passageway of each connector flares in a first divergent region then narrows in a second region that is convergent in the direction of a free end to form a chamber dimensioned to house the obturation head while allowing the flow of fluid around the head out of the passageway in the coupling configuration and to form a sealed contact with the obturation head in the uncoupled configuration to block the flow of fluid out of the passageway.

In a preferred embodiment of the invention, the body of each valve comprises a distal guide tenon extending a distal portion of the obturation head, around which the elastic return member is wound and the connector comprises a fixing support for this tenon.

In a preferred embodiment of the invention, each connector comprises an inner bore which widens to a proximal free end and an insert tip adaptable within the inner bore which axially has a sectional constriction to define in the inner passageway a convergent proximal region which narrows substantially 30 to the proximal free end of the connector as an extension of a divergent distal region.

In a preferred embodiment of the invention, the inner bore has at least one peripheral radial shoulder and the insert tip is configured to be introduced into the inner bore abutting against said shoulder.

In a preferred embodiment of the invention, the female connector comprises a case body in the general shape of a socket and the male connector comprises a case body comprising an insertion portion in the general shape of a plug configured to plug in, up to a final coupling position, inside a coupling clamp formed on the periphery of the body of the female connector and of generally U-shaped axial section.

In a preferred embodiment of the invention, the female connector comprises an outer peripheral skirt which extends longitudinally from an outer surface of a peripheral wall of the female connector defining the inner passageway and which extends beyond a proximal free end of this peripheral wall.

In a preferred embodiment of the invention, the male connector comprises a peripheral wall comprising a stepped inner profile provided with a tier defining a widened insertion end portion in the shape of a plug.

In a preferred embodiment of the invention, the connector comprises a locking element displaceable in a locking configuration wherein said element prevents the connectors from leaving the final coupling position.

In a preferred embodiment of the invention, the female connector comprises at least one slot in a circumferential direction and further comprises a jumper engaged in the slot to retain the male connector inside the body of the female connector.

In a preferred embodiment of the invention, each female or male connector is made of a plastic material, for example by injection moulding of the plastic material.

BRIEF DESCRIPTION OF THE DRAWINGS

Other features and advantages of the invention will appear in light of the description which follows, made with reference to the accompanying drawings wherein:

FIG. 1 represents a perspective and cutaway view of a quick obturation coupling connection according to the invention in a coupled configuration;

FIG. 2 represents a perspective and cutaway view of a female connector of the coupling connection of FIG. 1;

FIG. 3 represents a perspective and cutaway view of a male connector of the coupling connection of FIG. 1;

FIG. 4 represents a perspective view of two valve bodies respectively of the female connector and the male connector of FIG. 2 in an uncoupled configuration of the connection according to the invention;

FIG. 5 represents a longitudinal sectional view of two valve bodies respectively of the female connector and the male connector of FIG. 2 in an uncoupled configuration of the connection according to the invention;

FIG. 6 schematically illustrates a step of assembling the coupling connection according to the invention.

DESCRIPTION OF EMBODIMENTS

Figure 5:
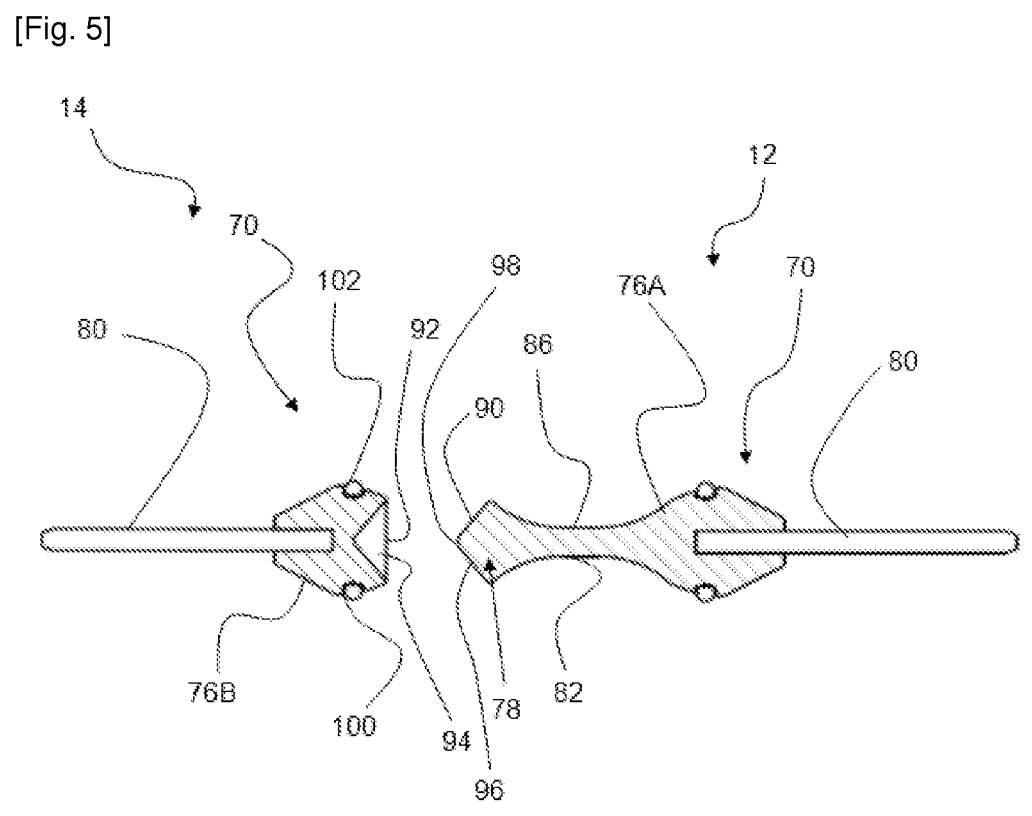

FIGS. 1 to 6 show a quick obturation fluidic connection according to the invention. This connection is designated by the general reference 10.

This connection 10 comprises a male connection element, hereinafter designated male connector 12 and a female connection element hereinafter designated female connector 14.

In the remainder of the description, the terms "longitudinal" and "radial" are used with reference to the main axis X. Furthermore, in the remainder of the description, the terms "proximal" and "distal" are used respectively to designate the elements of the male connector located on the side of the female connector and on the side opposite the female connector. This designation is also used analogously for the elements of the female connector with reference to their position relative to the male connector. Thus, within the meaning of the present description, an element will be qualified as proximal or distal depending on whether it is close to or distant axially from a coupling zone of the male 12 and female 14 connectors.

The connectors 12 and 14 are able to fit into each other for the removable junction of two fluid ducts of a fluid transfer circuit (not shown). Each connector 12 or 14 defines an inner fluid passageway and the coupling of the two connectors 12 and 14 forms a resulting inner passageway for the circulation of the fluid through the connection 10.

As shown in FIG. 3, the male connector 12 comprises a male case body 16 which defines an inner passageway 18 which extends along the axis X and passes through the male body 16 from one end to the other. The male case body 16 comprises a proximal end 20 for coupling with the female connector 14 and a distal end 22 for connecting to a fluid duct of a fluid transfer circuit (not shown in the figures). For example, the distal end 22 is configured to be fitted into a flexible tube. The two proximal 20 and distal 22 ends are connected together by a peripheral wall 24 externally defining the male case body 16.

Similarly, as shown in FIG. 2, the female connector 14 includes a female case body 30 which defines an inner passageway 32 which extends along the axis X and passes through the female body 30 from one end to the other. The female case body 30 comprises a proximal end 34 for coupling with the male connector 12 and a distal end 36 for connecting to a fluid duct of a fluid transfer circuit (not shown in the figures). The two ends 34 and 36 are connected together by a peripheral wall 38 externally defining the female case body 30.

In the preferred embodiment of the invention, the female case body 30 is in the general shape of a socket and the male case body 16 is in the general shape of a plug configured to plug in, up to a final coupling position, inside a coupling clamp 40 formed on the periphery of the female case body 30 and of axial section (that is to say longitudinal, in the direction of length) in a general U shape.

Preferably, as illustrated in FIG. 2, the clamp 40 forms a groove 42 for inserting a proximal free end portion 20 of the male case body 16. In this example, this insertion end portion 28 is in the shape of an annular plug.

For this purpose, preferably, the female connector 14 comprises an outer peripheral skirt 44 which extends longitudinally from an outer surface of the peripheral wall 38 of the female connector 12 and which extends axially beyond the free proximal end 34 of this peripheral wall 38. In this case, and as is clearly visible in FIG. 2, the inner female passageway 32 opens onto a proximal fluid flow orifice through its proximal free end 34 located in axial recess of a free receiving end 46 of the peripheral skirt 44. Moreover, as illustrated in FIG. 2, the female connector 14 further comprises an environmental sealing gasket 48 located inside the groove 42 in order to ensure sealing against the outer environment of the connection 10.

These connectors 12 and 14 are shown in an uncoupled configuration in FIG. 5 wherein the male connector 12 and the female connector 14 are spaced apart from each other and in a coupled configuration in FIG. 1 wherein the male connector 12 and the female connector 14 are plugged into each other.

In the preferred embodiment, the connection 10 further comprises a locking device 50, displaceable in a locking configuration wherein this locking device 50 prevents the connectors 12 and 14 from leaving the final coupling position.

For this purpose, in the example illustrated in FIG. 2, the female connector 14 comprises at least one slot 52, and preferably two slots 52, in a circumferential direction and further a comprises jumper, for example in the shape of a pin 54 engaged in the slots 52 to retain the male connector 12 inside the body of the female connector 14. In this example, the locking device 50 is thus formed by at least the pin 54 and by the slots 52.

For example, the pin 54 is composed of an elastically deformable metal wire element and comprises a pair of parallel branch portions and a connection portion connecting the upper ends of the branches to each other. Conventionally, the locking element 54 has for example a general U-pin shape and has two branches substantially parallel to each other, capable of passing through the female case body 30, from the outside, to engage in the circumferential slots 52 of the case of the female connector 30. Moreover, the body of the housing 16 of the male connector 12 has a circumferential groove 27 inside which the jumper 54 engages.

More particularly, according to the invention, each connector 12 or 14 comprises a valve 70 that is axially displaceable in the inner passageway 18 or 32 against an elastic return member 72.

For example, each valve 70 comprises a body 74 provided with a portion of widened section 76 forming an obturation head and a proximal free end 78 for junction with the other valve 70.

In particular, the valves 70 interact with one another by mutually pushing one another into a fluidically open position in a coupling configuration of the two connectors 12 and 14 (FIG. 1) and the valves 70 are elastically returned to a sealed obturation position of the inner passageway 18 or 32 by means of their obturation heads 76 in a configuration in which the two connectors 12 and 14 are uncoupled (FIG. 6).

For this purpose, as visible in FIG. 2 or FIG. 3, the inner passageway 18 or 32 of the connector 12 or 14 flares in a first divergent region then narrows in a second region that is convergent in the direction of the free proximal end 20 or 34 to define a chamber dimensioned to house the obturation head 76 in the coupling configuration while allowing the flow of fluid around the head 76 out of the passageway 18 or 32. The inner passageway 18 or 32 also defines, in the second converging portion, after the chamber and towards the proximal end 20, an annular seat for sealed contact with the obturation head 76 in the uncoupled configuration having the effect of blocking the flow of the fluid out of the passageway 18 or 32.

In the example illustrated, each connector 12 or 14 body comprises an inner bore 60 which defines an inner profile which widens towards its proximal free end 18 or 32 and an insert tip 64, adaptable inside the inner bore 60, to define a converging profile in the inner passageway 18 or 32 between a distal end edge 66 and a proximal end edge 68 of the tip 64.

For example, the inner bore 60 has at least one peripheral radial shoulder 62. Furthermore, preferably, the insert tip 64 is configured to be introduced into the inner bore 60 through the proximal end 20 or 34 of the connectors 12 or 14 until reaching the peripheral radial shoulder 62 against which the distal edge 66 of the insert tip 64 abuts.

This insert tip 64 has for example a general tubular shape with a wall provided with a substantially cylindrical outer surface and provided with an inner surface having axially a sectional constriction of the distal end edge 66 towards its proximal end edge 68.

In the preferred embodiment of the invention, each female or male connector 12 or 14 is made of a plastic material, for example by injection moulding of the plastic material.

Preferably, the insert tip 64 is assembled by ultrasonic welding to the body of the connector 12 or 14.

In a configuration mounted inside the inner bore 60, the insert tip 64 thus defines the profile of the inner passageway 18 or 32 with the second converging region which narrows substantially from the radial shoulder 62 so as to extend the first divergent region which flares significantly up to the shoulder 62.

Preferably, the insert tip 64 is for example rotationally welded to the connector 12 or 14 body.

In the coupling configuration illustrated in FIG. 1, the inner passageways 18 and 32 of the two connectors 12 and 14 join substantially continuously from one another and the section of the resulting passageway varies progressively and continuously along the main axis X.

Moreover, preferably, the peripheral wall 24 of the male connector 12 comprises a stepped axial extension 28 extending axially beyond a proximal opening orifice of the male inner passageway 18 in order to form the insertion end portion of widened section 28 in the shape of a plug configured to be engaged inside the clamp 44 by the free receiving end 46 of the body of the female connector 14. Preferably, the wall 24 defines an inner surface comprising a stepped profile provided with a tier 26. The proximal opening orifice of the inner passageway 18 of the male connector 12 is in this example formed by an orifice defined by the proximal edge 68 of the insert tip 64 of the male connector 12. The proximal opening orifice of the inner passageway 32 of the female connector 14 is formed in this example by an orifice defined by the proximal edge 68 of the insert tip 64 of the female connector 14.

Preferably, the body of each valve 70 further comprises a distal guide tenon 80 extending a distal portion of the obturation head 76, around which the elastic return member 72 is wound and each connector 12 or 14 comprises a support 81 for fixing this tenon 80. For example, this support 81 is in the form of a plurality of radial 81R fins having a central passageway 83 for receiving and guiding the guide tenon 80 and a plurality of peripheral passageways for the fluid flow through the connectors. Furthermore, the support 81 has a proximal end face forming an axial stop of the elastic member 72.

In the example illustrated in the figures, the tenon 80 is in the shape of a rod, which is preferably cylindrical.

In 41 the description, the remainder of obturation head 76 of the male connector 12 will be designated by the reference 76A and the obturation head 76 of the female connector 14 will be designated by the reference 76B.

In accordance with the invention, the body 72 of one of the valves 70, in this example the valve 70 of the male connector 12, comprises a segment 82 for connecting the obturation head 76A to the free proximal end of the junction 78 having a portion 84 that is convergent in the direction of a neck 86 and a portion 88 that is divergent up to the free end 78 to define a widened end joining surface 90.

As can be seen in FIG. 4, the profile of said segment 82 has a substantially hyperboloid general shape. In this example, the valve body 70 of the male connector 12 has an elongated shape having substantially flared end portions which gives the valve body 70 of the male connector 12 a general hyperboloid shape.

Furthermore, the obturation head 76A of the other valve 70, in this example the valve 70 of the female connector 14, is truncated at its proximal free end 78 to define a widened end joining surface 92. In this example, the two widened joining surfaces 90 and 92 interact with one another in the coupling configuration of the two connectors 12 and 14. Moreover, the joining surfaces 90 and 92 have complementary embedding reliefs 94 and 96.

Preferably and as illustrated in FIGS. 4 and 5, each obturation head 76A or 76B further comprises a circumferential groove 100 for housing a sealing gasket 102. This sealing gasket 102 is configured to be in sealed contact inside the inner passageway 18 or 32 of the connector 12 or 14 in the uncoupled configuration.

It will be noted that in the coupling configuration illustrated in FIG. 1, the two joined form valves 70 together a member substantially symmetrical in revolution around the main axis X. Moreover, preferably, this member has an envelope of longitudinal section having a generally curvilinear shape with progressive variation along the axis of the connection 10. This conformation of the member allows to minimise pressure drops, turbulence and the risk of cavitation inside the connection 10. In the embodiment illustrated, the member has two ovoid shapes linked together by a hyperboloid of revolution. In other words, preferably, the member has a longitudinal section which varies progressively along a curvilinear longitudinal profile, that is to say without step.

In the example illustrated in FIG. 4, the joining surface 92 of one of the valves 70 is provided with a cavity 94 and the joining surface 90 of the other of the valves 70 is in the shape of a domed vertex 96 shaped to match the shape of the cavity 94.

Preferably, as visible in FIG. 5, the end surface 92 in the shape of a domed vertex 96 has a generally conical shape provided with a centring point end 98. Moreover, preferably, the cavity 94 has a general complementary conical shape.

In the preferred embodiment of the invention illustrated in FIGS. 1 to 6, one of the obturation heads 76A has a general overall ovoid shape having a vertex axially defining distal and proximal portions each of progressively decreasing section from the vertex and the other of the obturation heads 76B has a general partial ovoid shape, truncated after the vertex in its proximal portion.

The main aspects of the operation of the connection according to the invention will now be described with reference to FIGS. 1 to 6.

Initially, the male 12 and female 14 connectors are in an uncoupled configuration as illustrated in FIG. 6. In this configuration, the valves 70 are elastically returned to an obturation position wherein each obturation head 76A or 76B is in sealed contact with the inner wall of the inner passageway 18 or 32 in the second converging portion of the passageway 18 or 32 which comprises the annular sealing seat.

Then, the male connector 12 is inserted into the receiving end 34 of the female connector 14, for example by engaging the plug-shaped insertion portion 28 of the male connector 12 inside the clamp 44 for plugging in the female connector 14.

In this coupling configuration, the two valves 70 interact through their joining surfaces 90 and 92 by mutually pushing one another. In this coupling configuration, the obturation head 76A or 76B of each of the valves 70 is positioned inside the chamber defined in the inner passageway 18 or 32 so that the fluid can flow freely by bypassing the profile of the obturation head 76A or 76B.

The positioning of the two valve bodies 70 is precise thanks to their particular conformation defined by the invention. Indeed, the two joining surfaces 90 and 92 are relatively wide, which allows to carry out relative positioning facilitated by the additional presence of a centring point 98 formed on one of the two obturation heads 76A and 76B and a complementary cavity 94 for receiving the domed vertex 96 in the shape of a point 98.

Of course, the invention is not limited to the embodiments previously described. Other embodiments within the reach of the person skilled in the art can also be considered without departing from the scope of the invention defined by the claims below.

The invention claimed is:

1. A quick obturation fluidic connection comprising
   a male connector and a female connector configured to fit into one another, the male connector and the female connector each comprising
   an inner fluid passageway extending along a main axis and
   a valve that is axially displaceable in the inner fluid passageway against an elastic return member, the valve comprising a body including a portion of widened section forming an obturation head and a proximal free end for junction with the valve of another connector, wherein
   the valve of the male connector and the valve of the female connector are configured to interact with one another by mutually pushing one another into a fluidically open position in a coupling configuration of the male connector and the female connector,
   the valve of the male connector and the valve of the female connector are each configured to be elastically returned to a sealed obturation position of the passageway by the respective obturation heads in a configuration in which the valve of the male connector and the valve of the female connector are uncoupled,
   the body of the valve of one of the male connector and the female connector comprises a connecting segment extending from the obturation head of the valve of the one of the male connector and the female connector to a proximal free end of the valve of the one of the male connector and the female connector,
   the connecting segment comprises a portion that is convergent in the direction of a neck and a portion that is divergent up to the proximal free end to define a widened end surface,
   the obturation head of the valve of the other of the male connector and the female connector is truncated at a proximal free end of the other of the male connector and the female connector to define a widened end joining surface, the widened end surface of the valve of one of the male connector and the female connector includes a cavity, and the widened end surface of the valve of the other of the male connector and the female connector is in the shape of a domed vertex shaped to match a shape of the cavity, so that in the coupling configuration, the widened end surface of the male connector and the widened end surface of the female connector join each other through the domed vertex and the cavity to form a substantially symmetrical member of revolution around a main axis, the symmetrical member having a longitudinal section which varies according to a curvilinear and progressive longitudinal profile.

2. The connection according to claim 1, wherein each obturation head comprises a circumferential groove for housing a sealing gasket.

3. The connection according to claim 1, wherein in the coupling configuration, the inner passageways of the male connector and the female connector join substantially continuously from each other and the section of the resulting passageway varies progressively and continuously along the main axis.

4. The connection according to claim 1, wherein the profile of the segment has a substantially hyperboloid general shape.

5. The connection according to claim 1, wherein the widened end surface in the shape of a domed vertex has a generally conical shape provided with a centring point end.

6. The connection according to claim 1, wherein one of the obturation heads has a general entire ovoid shape having a vertex axially defining distal and proximal portions each having a progressively decreasing section from the vertex and the other of the obturation heads has a general partial ovoid shape, truncated after the vertex in its proximal portion.

7. The connection according to claim 1, wherein the inner passageway of each of the male connector and the female connector flares in a first divergent region then narrows in a second region that is convergent in the direction of a free proximal end to form a chamber dimensioned to house the obturation head while allowing the flow of fluid around the head out of the passageway in the coupling configuration and to form a sealed contact with the obturation head in the uncoupled configuration to block the flow of fluid out of the passageway.

8. The connection according to claim 1, wherein the body of each valve comprises a distal guide tenon extending a distal portion of the obturation head, around which the elastic return member is wound and the connector comprises a fixing support for this tenon.

9. The connection according to claim 1, wherein each connector comprises an inner bore which widens to a proximal free end and an insert tip adaptable within the inner bore which axially has a sectional constriction to define in the inner passageway a convergent proximal region which narrows substantially to the proximal free end of the connector as an extension of a divergent distal region.

10. The connection according to claim 9, wherein the inner bore has at least one peripheral radial shoulder and the insert tip is configured to be introduced into the inner bore abutting against the shoulder.

11. The connection according to claim 1, wherein the female connector comprises a case body in the general shape of a socket and the male connector comprises a case body comprising an insertion portion in the general shape of a plug configured to plug in, up to a final coupling position, inside a coupling clamp formed on the periphery of the body of the female connector and of generally U-shaped axial section.

12. The connection according to claim 1, wherein the female connector comprises an outer peripheral skirt which extends longitudinally from an outer surface of a peripheral wall of the female connector defining the inner passageway and which extends beyond a proximal free end of this peripheral wall.

13. The connection according to claim 1, wherein the male connector comprises a peripheral wall comprising a stepped inner profile provided with a tier defining a widened insertion end portion in the shape of a plug.

14. The connection according to claim 13, comprising a locking element displaceable in a locking configuration wherein the element prevents the connectors from leaving a final coupling position.

15. The connection according to claim 14, wherein the locking element comprises at least one slot formed in a circumferential direction of the female connector and a jumper engaged in the at least one slot to retain the male connector inside the body of the female connector.

16. The connection according to claim 1, wherein each female or male connector is made of a plastic material.

* * * * *